(12) United States Patent
Haran et al.

(10) Patent No.: US 8,319,389 B2
(45) Date of Patent: Nov. 27, 2012

(54) SEGMENTED STATOR ASSEMBLY

(75) Inventors: Kiruba Sivasubramaniam Haran, Clifton Park, NY (US); James Pellegrino Alexander, Ballston Spa, NY (US); Jay Zhiqiang Cao, Niskayuna, NY (US); Evangelos Trifon Laskaris, Schenectady, NY (US); Murtuza Lokhandwalla, Clifton Park, NY (US); Jeremy Daniel Van Dam, West Coxsackie, NY (US); Robert Michael Zirin, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/871,276

(22) Filed: Aug. 30, 2010

(65) Prior Publication Data

US 2011/0266807 A1 Nov. 3, 2011

(51) Int. Cl.
*H02K 1/18* (2006.01)
(52) U.S. Cl. ............ 310/216.008; 310/216.109
(58) Field of Classification Search ........... 310/216.004, 310/216.007–216.009, 216.016, 216.035, 310/216.049, 216.051, 216.057, 216.079, 310/216.091, 216.098, 216.102, 216.109, 310/216.114, 12.24
See application file for complete search history.

(56) References Cited

U.S. PATENT DOCUMENTS

| | | | | |
|---|---|---|---|---|
| 893,711 | A * | 7/1908 | Cushman | 310/216.098 |
| 932,537 | A * | 8/1909 | Cushman | 310/224 |
| 1,045,159 | A * | 11/1912 | Lundell | 310/224 |
| 2,736,829 | A * | 2/1956 | Sills | 310/216.098 |
| 4,593,223 | A * | 6/1986 | Lehoczky | 310/431 |
| 6,611,076 | B2 * | 8/2003 | Lindbery et al. | 310/216.004 |
| 6,781,276 | B1 | 8/2004 | Stiesdal et al. | |
| 6,960,861 | B2 * | 11/2005 | Yoneda et al. | 310/216.012 |
| 2009/0134629 | A1 | 5/2009 | Stiesdal | |
| 2009/0140526 | A1 | 6/2009 | Jansen et al. | |
| 2009/0256431 | A1 | 10/2009 | Stiesdal | |

FOREIGN PATENT DOCUMENTS

| | | |
|---|---|---|
| WO | 03073591 A1 | 9/2003 |
| WO | 2006008331 A1 | 1/2006 |

* cited by examiner

*Primary Examiner* — Dang Le
(74) *Attorney, Agent, or Firm* — Marie-Claire Maple

(57) ABSTRACT

An electric machine and stator assembly includes a segmented stator having stator portions. Each stator portion includes stator laminations, end plates arranged axially on opposing sides of the stator portion, and structural plates arranged interior to the end plates. Each of the support plates has a portion with notch-like structures that is embedded within the stator laminations. Stabilizing couple the end plates and the structural plates together. Connectors are provided to connect the stator portions together.

20 Claims, 13 Drawing Sheets

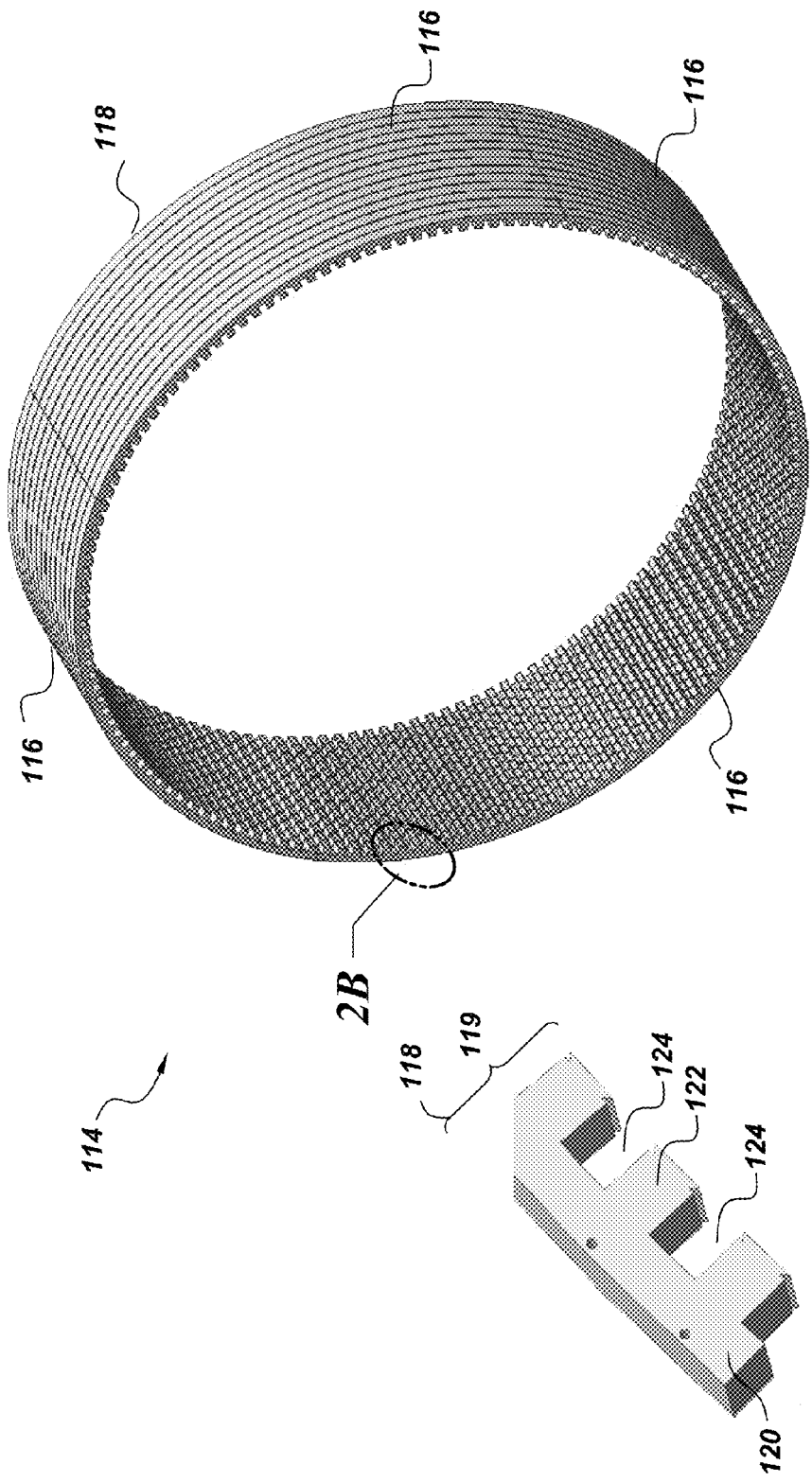

SEGMENTED STATOR ASSEMBLY

CROSS-REFERENCE TO RELATED APPLICATIONS

This application is related to co-pending U.S. patent applications entitled "SEGMENTED STATOR ASSEMBLY".

BACKGROUND

Generators have been widely used in a variety of applications including aircraft, automobiles and turbines. Generators typically include a stator and a rotor that work together to produce electricity. Wind turbines have received increased attention recently as an environmentally safe alternative energy source. Wind turbines convert the kinetic energy of the wind into mechanical power and then the mechanical power drives the generator to produce electricity.

Offshore wind turbines typically have ratings of 3 MW and higher, necessitated by the economics of wind energy production. Also offshore turbines employ a direct drive generator to improve reliability, unlike most land based utility scale wind turbines that utilize a geared generator. These ratings and the fact that the generator is directly driven manifests into a very large size and weight. A machine greater than 4 m in diameter is difficult and costly to transport by conventional means and necessitates segmentation.

Alternatively, a 3 MW machine could be made within a 4 m diameter limit by making it axially longer or utilizing a double-sided configuration. Both of these options present challenges. An axially longer machine weighs significantly more than a shorter length larger diameter machine whereas a double-sided configuration presents significant manufacturing complexity. While the segmented stator structures facilitate cost and transport, particularly when designed to accommodate conventional rail or road shipping constraints, they are difficult to manufacture and assemble at site.

For these and other reasons, there is a need for the present invention.

SUMMARY

An electric machine and stator assembly includes a segmented stator having stator portions. Each stator portion includes stator laminations, end plates arranged axially on opposing sides of the stator portion, and structural plates arranged interior to the end plates. Each of the support plates has a portion with notch-like structures that is embedded within the stator laminations. Stabilizing couple the end plates and the structural plates together. Connectors are provided to connect the stator portions together.

BRIEF DESCRIPTION OF THE DRAWINGS

The nature and various additional features of the invention will appear more fully upon consideration of the illustrative embodiments of the invention which are schematically set forth in the figures. Like reference numerals represent corresponding parts.

FIG. 2A illustrates a diagrammatic view of a stator assembly according to an exemplary embodiment of the present invention FIG. 2B illustrates a blown-up view of a portion of the stator assembly shown in FIG. 2A;

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Embodiments of the present invention will be explained in further detail by making reference to the accompanying drawings, which do not limit the scope of the invention in any way.

Exemplary embodiments of the invention disclosed herein are shown in the context of a generator for a wind turbine. However, this is only an example for the purpose of description. It is to be understood that the stator assembly according to embodiments of the invention can be used in any generator for electric machines. In addition, the generator can be a direct drive generator or any other generator used for electric machines.

Figure 1:
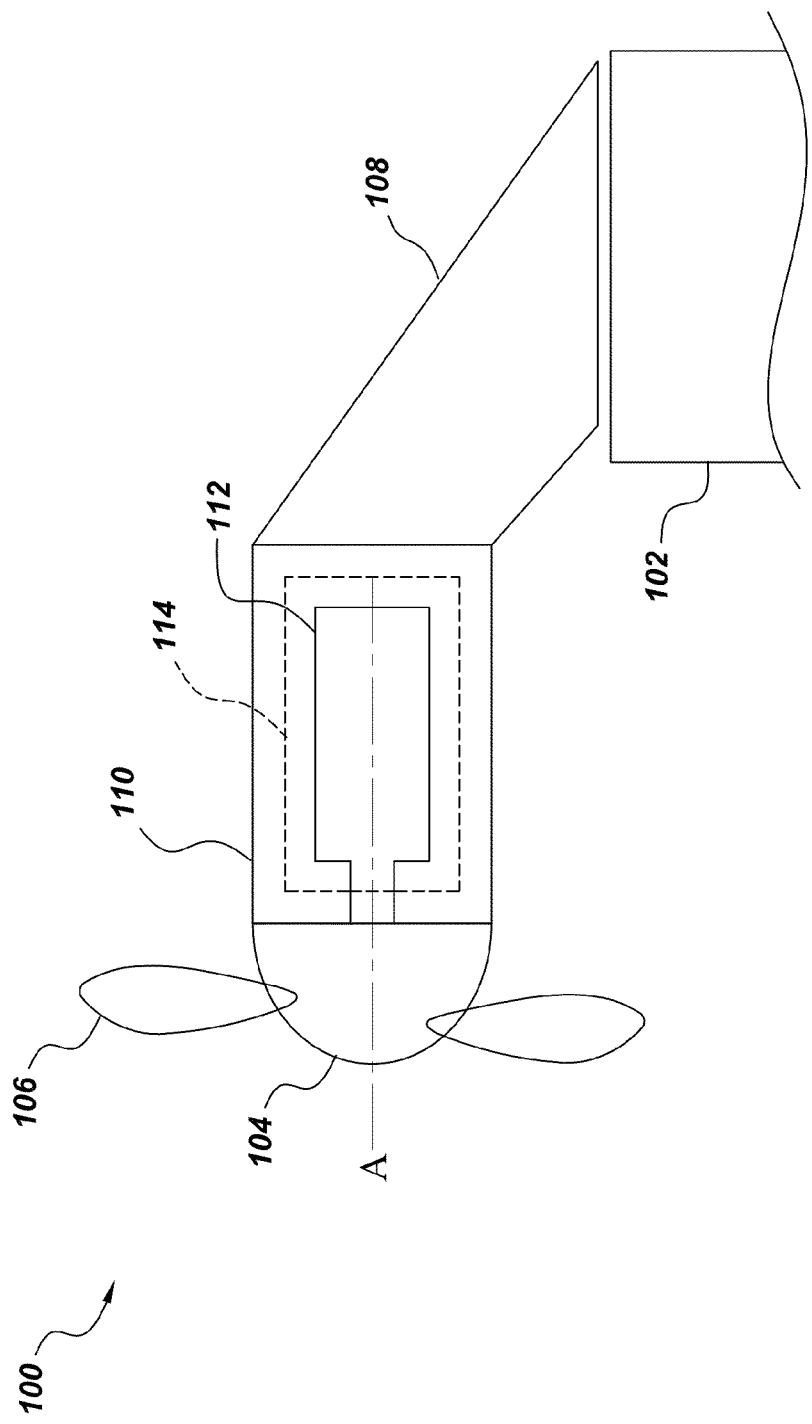
FIG. 1 illustrates a wind turbine having a stator assembly according to an exemplary embodiment of the invention.

FIG. 1 illustrates a wind turbine 100 arranged on a tower 102 having a hub 104 with blades 106. A generator 110 is provided on an extension 108 of the tower 102. The generator 110 includes a rotor assembly 112 and a stator assembly 114. An exemplary segmented stator assembly 114 is shown in more detail in FIGS. 2A and 2B. Although the example depicts the generator upstream of the tower 102, the generator location could be either upstream, downstream or on the tower, and the embodiments for stator segmentation discussed here apply to all such configurations.

FIG. 2A illustrates a diagrammatic view of a segmented stator according to an exemplary embodiment of the invention. The segmented stator assembly 114 includes stator segments or portions 116 each having stator laminations 118. In the example illustrated, four stator segments are shown. However, it is to be understood that the invention is not limited in this regard and that there can be any number of stator segments. FIG. 2B is a blown-up view of portion 119 of the segmented stator 114, which shows that each stator segment 116 includes stator laminations 118 each having a yoke or back iron 120 and stator teeth 122 defining stator openings 124. The stator openings 124 are provided to accommodate windings 136 (shown in FIG. 4).

Figure 3A:
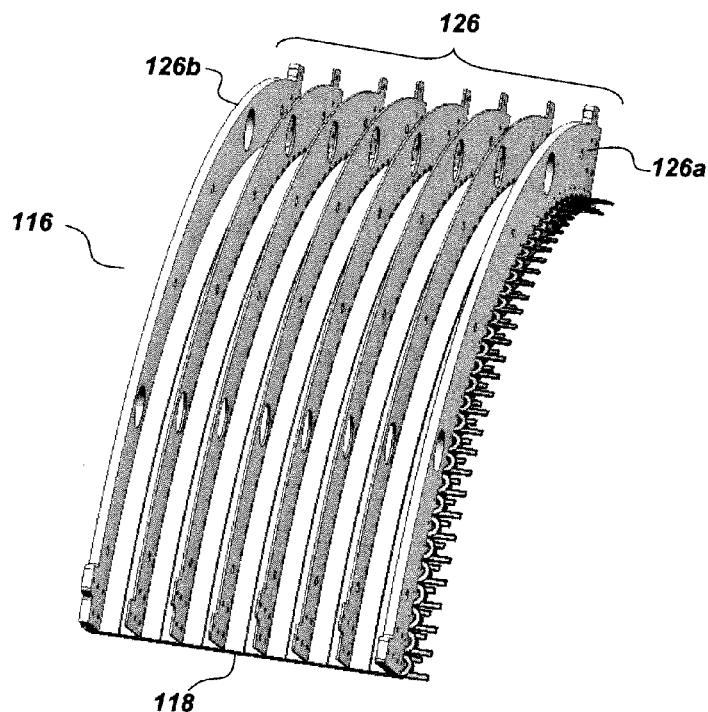
FIG. 3A illustrates a top view of a stator segment or portion of a stator assembly according to an exemplary embodiment of the present invention.

One of the stator segments 116 is shown in FIG. 3A. Each stator segment 116 includes structural plates (or support plates) 126. The structural plates 126 can include end plates 126a and 126b arranged exterior to intermediate or remaining structural plates 126 in an axial direction. The end plates 126a, 126b can be of the same or different thickness than the intermediate structural plates 126. For example, the end plates 126a, 126b can be significantly thicker than the other structural plates 126 to provide for structural integrity when the stator segments 116 are assembled to form the segmented stator assembly 114.

Figure 3B:
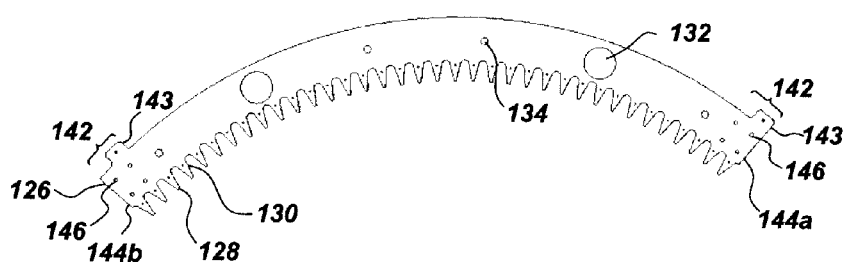
FIG. 3B illustrates a cross-sectional view of one of the support plates shown in FIG. 2A according to an exemplary embodiment of the present invention.
Figure 4:
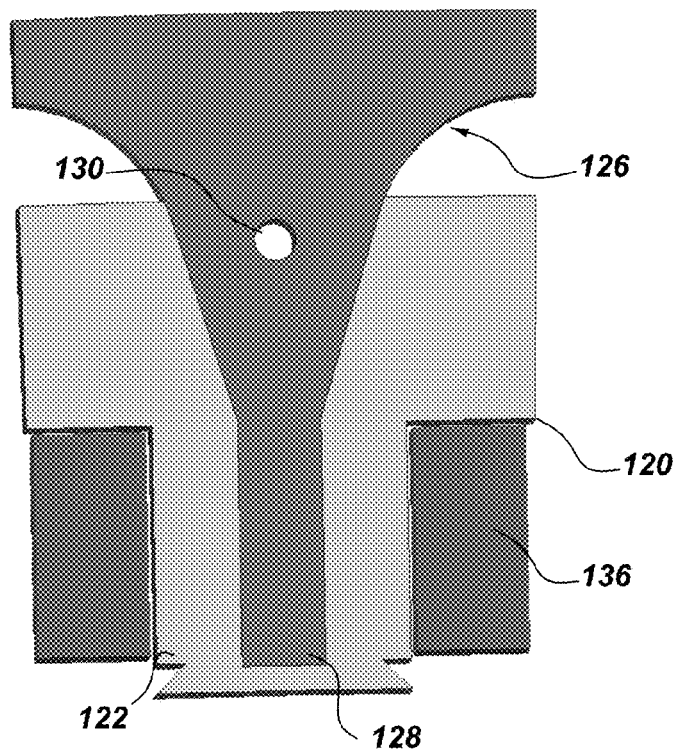
FIG. 4 illustrates a cross-sectional view of a structural plate in the stator segment shown in FIG. 3A.

As shown in FIG. 3B, each of the structural plates 126 includes notch-like or tooth-like structures 128 formed on a portion of the structural plate 126 along an inner circumference. The structural plates 126 are embedded into the stator laminations 118, as shown in FIG. 4, via the teeth 128. The structural plates 126 protrude radially outward beyond the stator core 118 to facilitate coupling of the structural plates to provide structural integrity to the stator segment 116. In the drawings, eight structural plates 126 are shown. However, it is to be understood that any number of structural plates 126 can be used depending on the design and application. The thickness and material of the structural plates 126 are of a size and material to minimize performance loss. The number and location of the structural plates depend upon the application and desired performance. In other embodiments, the end plates 126a, 126b need not be embedded into the stator laminations and can be configured without the tooth-like structures 128.

Figure 5:
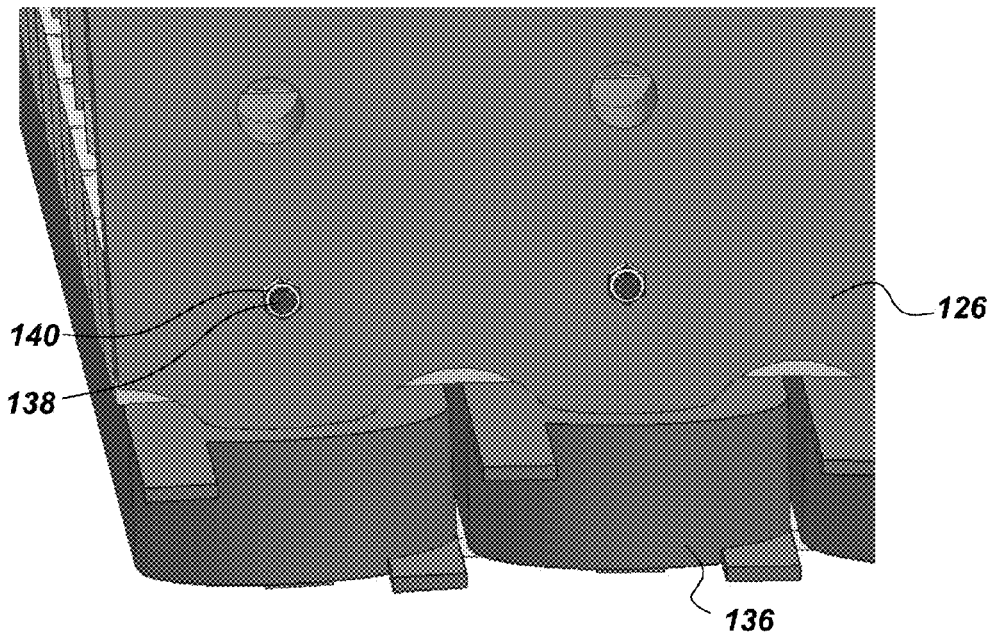
FIG. 5 illustrates a side view of the structural plates in the stator segment shown in FIG. 3A according to an exemplary embodiment of the present invention.

Referring to FIGS. 3B and 4, the structural plates 126 each include an opening 130 proximate each of the teeth 128 for receiving a securing member or a connector such as a tension rod or bolt, for example. Any suitable connector can be used and the opening can be arranged to accommodate the corresponding connector. The connector goes through the stator core 120 and the openings 130 in the structural plates 126. Referring to FIG. 5, tension rods or through-bolts 138 secured by nuts 140 are used to hold the structural plates 126 together firmly via the openings 130.

Referring to FIG. 3B, each of the structural plates 126 further includes openings 132 to receive additional connectors or stabilizing elements 148 such as pipes, I-beams, or some other suitable stabilizing elements to connect the structural plates 126 together. The additional connectors 148 provide support and rigidity to the stator segment 116 via the structural plates 126, which will provide structural integrity to the stator assembly 114 when the stator segments 116 are secured together. Each stator segment 116 may further include openings 134 to accommodate spacer elements 150 to provide another connection point for the structural plates 126.

Figure 6:
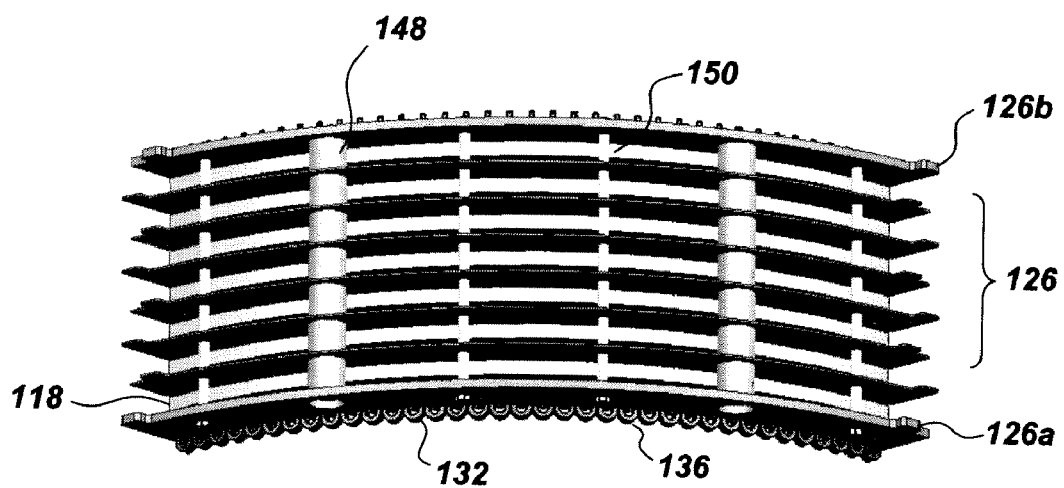
FIG. 6 illustrates a top view of a stator segment or portion of a stator assembly according to another exemplary embodiment of the present invention.

The spacer elements 150 can be any suitably rigid elements such as bolts, rivets or weldments, for example. In the exemplary embodiment shown in FIG. 6, both the stabilizing elements 148 and the spacer elements 150 are used. However, the stabilizing elements 148 can be used alone or in combination with any number of spacer elements 150.

While exemplary embodiments of the invention have been illustrated with multiple sets of openings 130, 132 and 134 to accommodate multiple sets of connectors, one skilled in the art will appreciate that embodiments of the invention are not limited to this arrangement and any single set of openings and connectors can be used to secure the structural plates 126 of the stator segment 116, or any combination of the sets of openings and respective connectors can be used. The location of the sets of openings can be arranged in any manner suitable to the application and configuration of the structural plates.

As shown in FIG. 3B, each structural plate 126 includes end portions 142 arranged at the outside circumferential end of each of the structural plates 126. The end portions 142 are provided to couple the structural plates 126 in a stator segment 116 to the structural plates 126 of other stator segments 116 to form the stator assembly 114. In the exemplary embodiment shown, for each structural plate 126, the end portions 142 each include a tab portion 143 that extends radially beyond the remainder of the structural plate 126. The tab portions 143 can be arranged such that one tab portion 143 is set back from the circumferential end 144a of the structural plate 126, while the other tab portion 143 is set at the opposite circumferential end 144b. However, embodiments of the invention are not limited in this regard and the end portions 142 can be formed to accommodate a selected coupling structure. Each end portion 142 includes openings 146. These openings 146 are provided to facilitate securing the structural plate 126 of one stator segment 116 to the structural plate 126 of another stator segment 116.

Figure 7A:
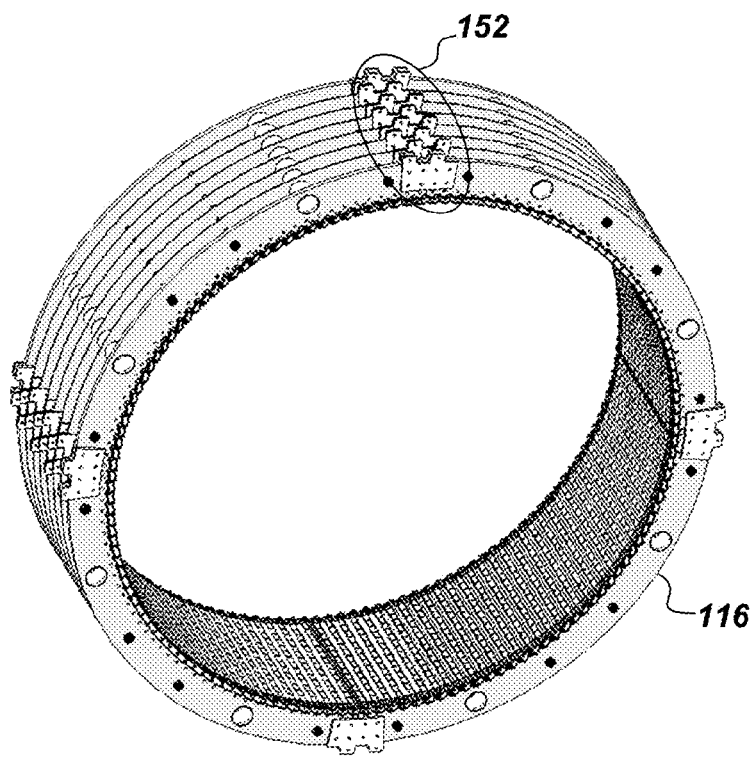
FIG. 7A illustrates a cross-sectional view of a segmented stator assembly having support plates according to an exemplary embodiment of the invention.
Figure 7B:
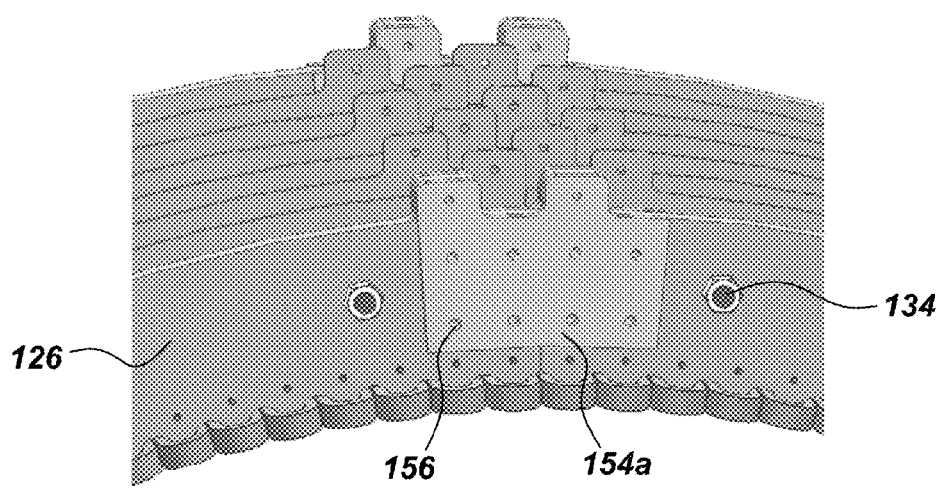
FIG. 7B illustrates a blown-up view of a portion of the segmented stator assembly shown in FIG. 7A.
Figure 8:
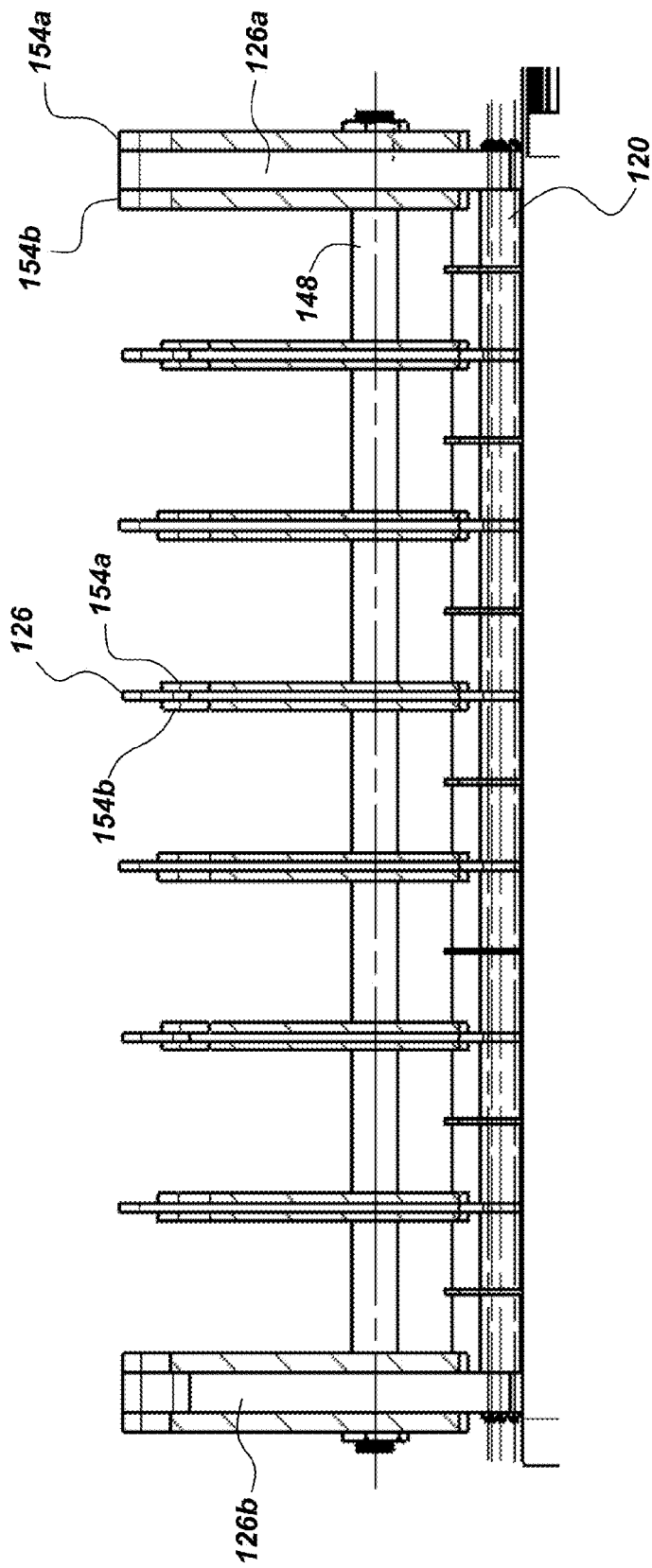
FIG. 8 illustrates a cross-sectional view of the stator segment having support plates and splice plates according to an exemplary embodiment of the present invention.

In the exemplary embodiment shown in FIGS. 7A, 7B and 8, the structural plates 126 are secured together via splice plates 154a and 154b. FIG. 7A shows the stator segments 116 assembled to form the stator assembly 114. FIG. 7B is a blown-up view of section 152 of FIG. 7A. FIG. 8 illustrates a cross-sectional view of a stator segment 116 including splice plates 154a and 154b. The splice plates 154a and 154b are configured to correspond to the form of the end portions 142, as shown in FIG. 3B. The splice plates 154a and 154b include openings 156 that correspond to the openings 146 in the end portions 142 of the structural plates 126. As shown in FIG. 8, the splice plates 154a and 154b are arranged axially on either side of the structural plates 126, including the end plates 126a, 126b that are to be coupled together. The splice plates 154a, 154b and the end portion 142 of adjacent structural plates 126 are coupled together by fastening elements such as bolts, for example. Other fastening means such as riveting, welding or brazing could also be used. Each of the structural plates 126 in the stator segment 116 is coupled to corresponding structural plates 126 of an adjacent stator segment 116 in this manner to provide a secure structure when the stator segments 116 are coupled together to form the stator assembly 114.

While end portions and splice plates have been used in the exemplary embodiments of the invention, one skilled in the art will appreciate that the structural plates 126 of adjacent stator segments 116 can be coupled together by any suitable mechanism to maintain the strength and structural integrity of the segmented stator assembly 114.

Figure 9:
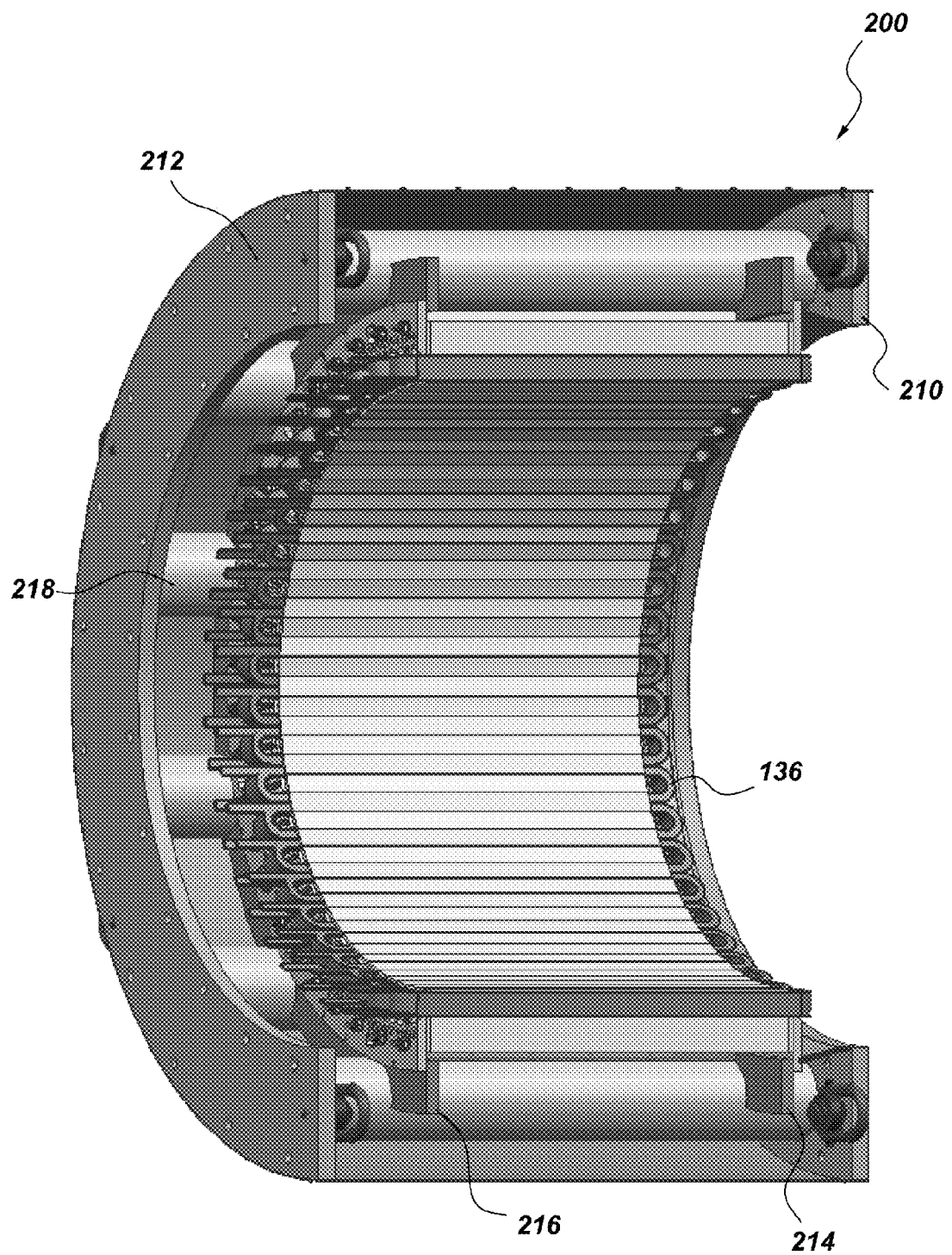
FIG. 9 illustrates a diagrammatic view of a stator segment of a stator assembly according to a further exemplary embodiment of the present invention.

Another exemplary embodiment of a stator segment is shown in FIG. 9. In this embodiment, the stator segment 200 includes end plates 210 and 212, compression plates 214 and 216, and stabilizing elements 218 such as pipes, for example, to couple all of the plates together to form a rigid structure for the stator segment 200. In this exemplary embodiment, there are no structures embedded in the stator laminations.

Figure 10:
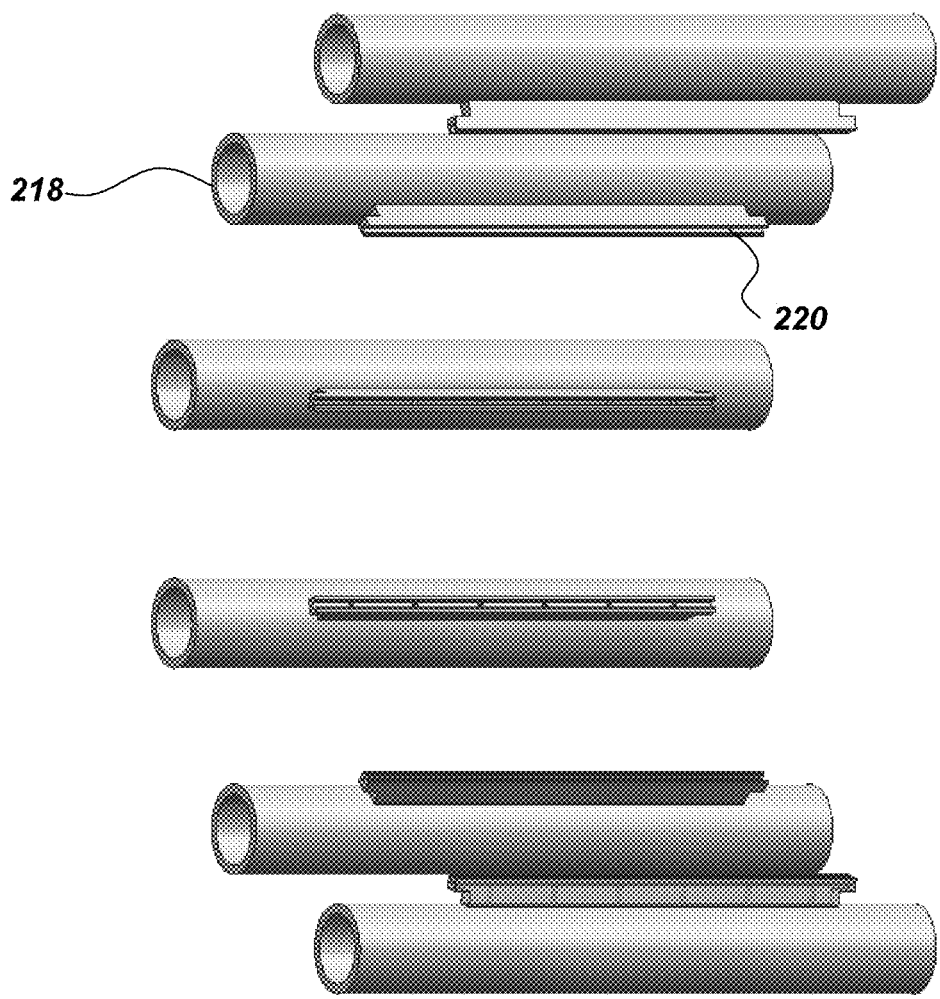
FIG. 10 illustrates stabilizing elements according to an exemplary embodiment of the invention.
Figure 11:
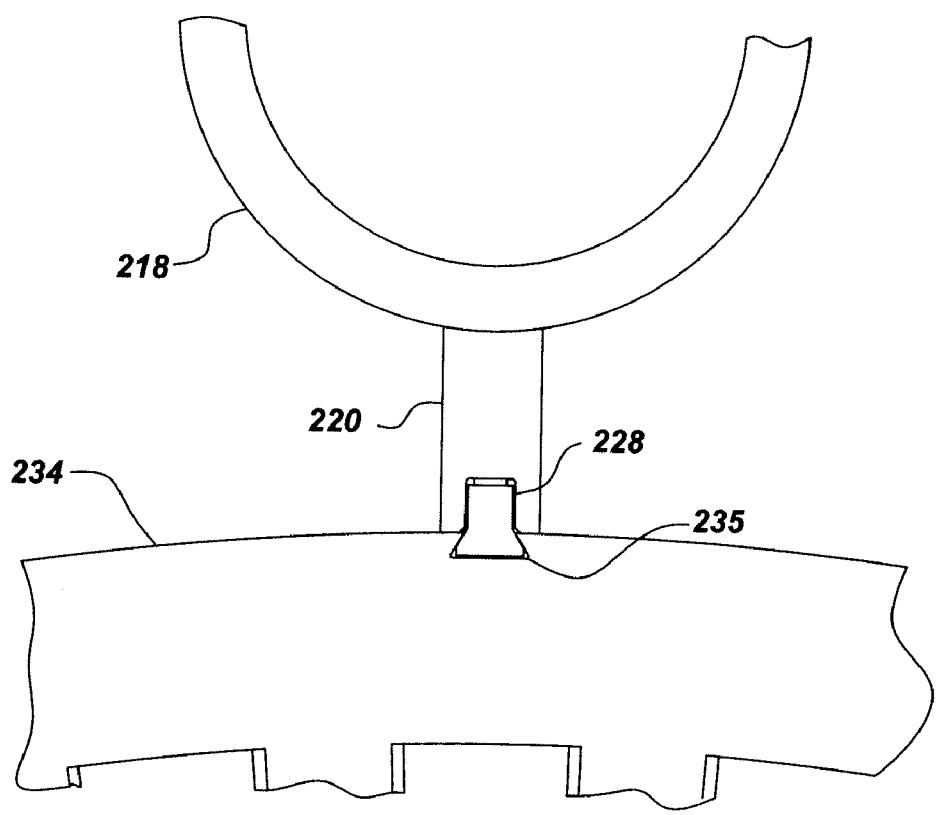
FIG. 11 illustrates a cross-sectional view of the stabilizing elements according to an exemplary embodiment of the invention.

Referring to FIGS. 10 and 11, each of the stabilizing elements 218 includes a dovetail bar 220. A dovetail 228 is secured to each of the dovetail bars 220. Each dovetail 228 engages with the stator laminations 234 (and with the supporting elements if utilized) and thus connects the laminations 234 to the stabilizing elements 218. As shown in FIG. 11, in this exemplary embodiment, each of the stator laminations 234 includes openings or notches 235 to accommodate the dovetails 228. The number of stabilizing elements 218 including dovetail bars 220 and dovetails 228 can be selected depending upon the particular configuration and desired stiffness of the stator segment. The number and location of notches 235 can be arranged to correspond to the number and location of the dovetails 228. The end plates 210, 212 and the compression plates 214, 216 are secured to the stabilizing elements 218, as shown in FIG. 11. They may be integral to the stabilizing elements 218 or secured to the stabilizing elements 218 by welding, for example, or other suitable means.

Figure 12:
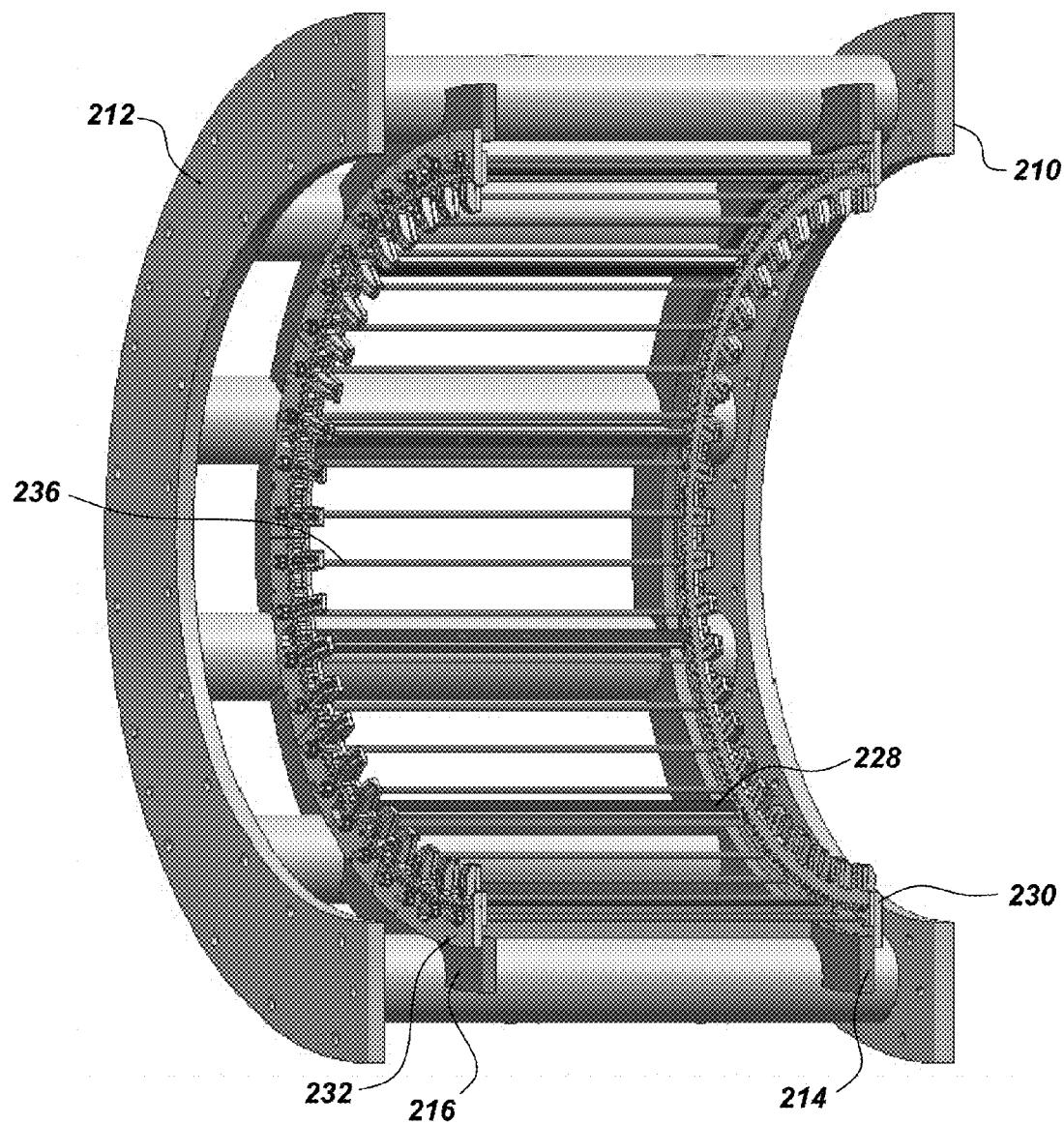
FIG. 12 illustrates a support structure for a stator segment according to an exemplary embodiment of the present invention.
Figure 13:
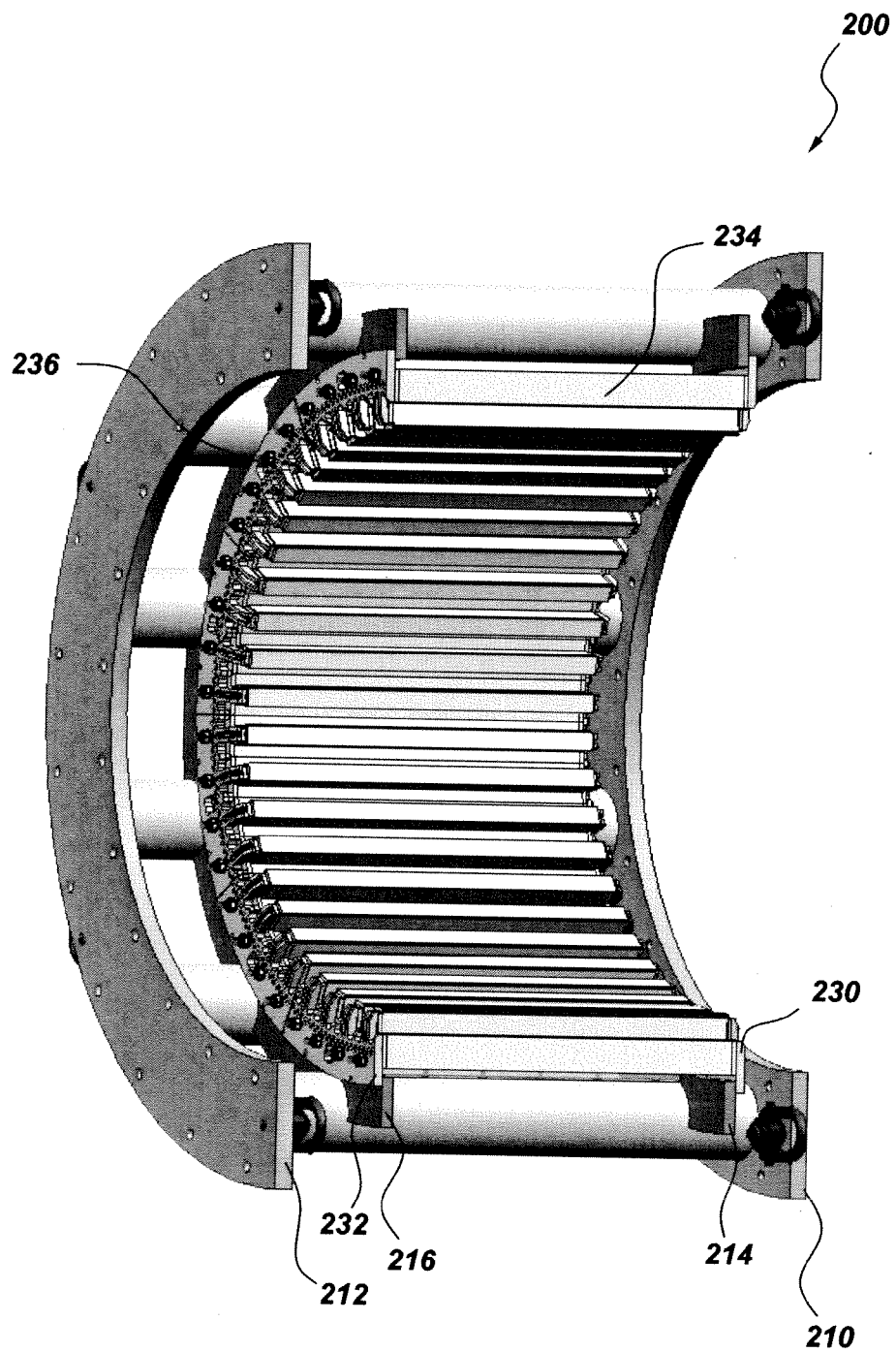
FIG. 13 illustrates the support structure for a stator segment a stator segment according to an exemplary embodiment of the invention.

Referring to FIGS. 12 and 13, clamping plates 230 and 232 are secured to the compression plates 214 and 216, respectively. Any suitable means can be used to secure the clamping plates 230, 232 to the compression plates 214, 216. The stator laminations 234 are arranged between the clamping plates 230 and 232. The clamping plates 230, 232 and stator laminations 234 are secured together via tension rods 236, or other suitable securing mechanism. In this exemplary arrangement, there are no supporting or structural elements or plates embedded into the stator laminations 234, however such elements may also be used. The strength of the stator segment 200 is established by the end plates 210, 212, the compression plates 214, 216 and the stabilizing elements 218, which support the stator laminations 234. In this exemplary embodiment, the end plates 210, 212 are of a thickness and material to provide strong support and structural integrity to the stator segments 200 as well as the stator assembly 114.

Figure 14:
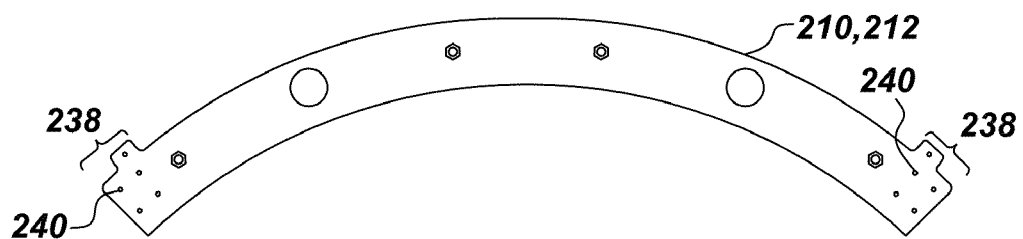
FIG. 14 illustrates a cross-sectional view of an end plate according to an exemplary embodiment of the invention.
Figure 15:
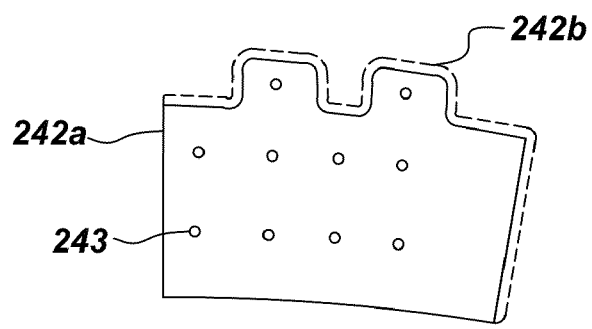
FIG. 15 illustrates connecting elements according to an exemplary embodiment of the present invention.

Referring to FIGS. 14 and 15, the end plates 210 and 212 have end portions 238 having openings 240 similar to the end portions 142 and openings 146 shown in FIG. 3B. As shown in FIG. 15, the end plates 210 and 212 of adjacent stator segments 200 are secured together via splice plates 242a and 242b in the same manner as the splice plates 154a, 154b. The splice plates 242a and 242b are configured to correspond to the form of the end portions 238. The splice plates 242a and 242b include openings 243 that correspond to the openings 240 in the end portions 238 of the end plates 210 and 212. The splice plates 242a and 242b are arranged axially on either side of the end plates 242a, 242b that are to be coupled together. The splice plates 242a, 242b and the end portion 238 of adjacent end plates 210, 212 are coupled together by fastening elements such as bolts, for example. Each of the end plates 210, 212 in the stator segment 200 is coupled to corresponding end plates 210, 212 of an adjacent stator segment 200 in this manner to provide a secure structure when the stator segments 200 are coupled together to form the stator assembly 114. In this exemplary embodiment, the splice plates 242a, 242b can be of a larger size such that if there are only two stator segments 200, the splice plates 242a, 242b can be semi-circle in size to provide the fullest support. The size of the splice plates can be designed to any suitable size.

While end portions and splice plates have been used in the exemplary embodiments of the invention, one skilled in the art will appreciate that the end plates 210, 212 of adjacent stator segments 200 can be coupled together by any suitable mechanism to maintain the strength and structural integrity of the segmented stator assembly 114.

The exemplary embodiments shown in FIGS. 5 and 9 show concentrated winding. In some embodiments, the stator coils are arranged concentrically, and wound around each of the stator teeth. In other embodiments, the stator coils are arranged concentrically, and wound around alternate ones of the stator teeth. The concentrated winding 136 is wound around the stator tooth and the number of stator slots per rotor pole per phase are <1, i.e. it is a fractional slot winding. As opposed to a conventional stator, wherein the number of slots per rotor pole per phase is equal to or greater than unity. The interaction of rotor poles and the slotted stator for the fractional slot winding results in various MMF harmonics, which are exploited to yield a harmonic coupled machine. The concentrated winding with harmonic coupling offers a higher fill factor for the coils, better aspect ratio of stator teeth, and shorter end windings, which combine to enable higher torque density with relatively high pole count. For example, a 2/7 slot-per-pole-per phase winding design can be used to build a harmonically coupled machine with seven times the number of poles employing the $7^{th}$ harmonic of the MMF distribution for the same number of coils as a two slots per-pole-per-phase design. This results in lower flux per pole, potentially by up to that ratio, and a corresponding reduction in rotor and stator back iron needed to carry EM flux. Also, this machine type is desirable for a segmented stator arrangement.

In the embodiments disclosed herein, a segmented stator assembly includes stator segments that provide for more cost effective shipping and installation while maintaining the strength and structural integrity of the large assemblies to achieve desired performance requirements. The stator segments can be of a size that can be shipped in industry standard shipping containers, thereby reducing the cost of shipping.

The electric machines discussed herein may be well suited for wind turbine applications. However, such machines may be employed in a variety of other applications.

While the invention has been described in terms of various specific embodiments, those skilled in the art will recognize that the invention can be practiced with modification within the spirit and scope of the claims.

What is claimed is:

1. A stator assembly, comprising:
a segmented stator having stator portions, wherein each stator portion comprises:
    stator laminations;
    end plates arranged axially on opposing sides of the stator portion;
    structural plates, arranged interior to the end plates, each having a portion that is embedded within the stator laminations, wherein the portion of each of the structural plates comprises notch-like structures; and
    stabilizing elements coupling the end plates and the structural plates together; and
connectors to connect the stator portions of the segmented stator together.

2. The stator assembly of claim 1, wherein each of the end plates comprises a portion having notch-like structures that is embedded within the stator laminations.

3. The stator assembly of claim 2, wherein the portion of each of the end plates and the structural plates comprises openings to receive securing members respectively to secure the end plates and the structural plates together.

4. The stator assembly of claim 1, wherein the portion of each of the structural plates comprises openings to receive securing members respectively to secure the structural plates together.

5. The stator assembly of claim 1, wherein each of the stabilizing elements comprises a pipe.

6. The stator assembly of claim 1, further comprising spacer elements coupling the end plates and the structural plates together.

7. The stator assembly of claim 1, wherein each of the connectors comprises splice plates arranged axially on either side of each of the end plates, the splice plates and the end plates comprising openings to accommodate securing elements, respectively, to secure the end plates of adjacent stator portions together.

8. The stator assembly of claim 7, wherein the connectors further comprise splice plates arranged axially on either side of each of the structural plates, the structural plates comprising openings to accommodates the securing elements, respectively, to secure the structural plates of adjacent stator portions together.

9. The stator assembly of claim 1, wherein a width of each of the end plates is greater than a width of each of the structural plates.

10. The stator assembly of claim 1, wherein a number of stator poles is different from a number of rotor poles of a rotor, and wherein electromagnetic coupling occurs at a harmonic of a fundamental stator magnetomotive force distribution.

11. The stator assembly of claim 1, further comprising stator coils, wherein each of the stator laminations comprises stator teeth, and wherein the stator coils are arranged concentrically, and wound around each of the stator teeth.

12. The stator assembly of claim 1, further comprising stator coils, wherein each of the stator laminations comprises stator teeth, and wherein the stator coils are arranged concentrically, and wound around alternate ones of the stator teeth.

13. A generator, comprising:
 a segmented stator having stator portions, wherein each stator portion comprises:
  stator laminations;
  end plates arranged axially on opposing sides of the stator portion;
  structural plates, arranged interior to the end plates, each having a portion that is embedded within the stator laminations, wherein the portion of each of the structural plates comprises notch-like structures; and
  stabilizing elements coupling the end plates and the structural plates together; and
 connectors to connect the stator portions of the segmented stator together.

14. The generator of claim 13, wherein each of the connectors comprises splice plates arranged axially on either side of each of the end plates and on either side of each of the structural plates, the splice plates, the end plates, and the structural plates comprising openings to accommodate securing elements, respectively, to secure the end plates and the structural plates of adjacent stator portions together.

15. The generator of claim 13, wherein a number of stator poles is different from a number of rotor poles of a rotor, and wherein electromagnetic coupling occurs at a harmonic of a fundamental stator magnetomotive force distribution.

16. A wind turbine, comprising:
 a segmented stator having stator portions, wherein each stator portion comprises:
  stator laminations;
  end plates arranged axially on opposing sides of the stator portion;
  structural plates, arranged interior to the end plates, each having a portion that is embedded within the stator laminations, wherein the portion of each of the structural plates comprises notch-like structures; and
  stabilizing elements coupling the end plates and the structural plates together; and
 connectors to connect the stator portions of the segmented stator together.

17. The wind turbine of claim 16, wherein each of the end plates comprises a portion having notch-like structures that is embedded within the stator laminations.

18. The wind turbine of claim 16, wherein the portion of each of the structural plates comprises openings to receive securing members respectively to secure the structural plates together.

19. The wind turbine of claim 16, wherein each of the connectors comprises splice plates arranged axially on either side of each of the end plates and on either side of each of the structural plates, the splice plates, the end plates, and the structural plates comprising openings to accommodate securing elements, respectively, to secure the end plates and the structural plates of adjacent stator portions together.

20. The wind turbine of claim 16, wherein a number of stator poles is different from a number of rotor poles of a rotor, and wherein electromagnetic coupling occurs at a harmonic of a fundamental stator magnetomotive force distribution.

* * * * *